(12) United States Patent
Michaud et al.

(10) Patent No.: US 12,091,488 B2
(45) Date of Patent: Sep. 17, 2024

(54) POLYURETHANE-BASED COMPOSITION

(71) Applicant: BOSTIK SA, Colombes (FR)

(72) Inventors: Guillaume Michaud, Venette (FR); Aurélien Wiegand, Venette (FR)

(73) Assignee: BOSTIK SA, Colombes (FR)

( * ) Notice: Subject to any disclaimer, the term of this patent is extended or adjusted under 35 U.S.C. 154(b) by 1018 days.

(21) Appl. No.: 17/043,924

(22) PCT Filed: Apr. 3, 2019

(86) PCT No.: PCT/FR2019/050767
§ 371 (c)(1),
(2) Date: Sep. 30, 2020

(87) PCT Pub. No.: WO2019/193278
PCT Pub. Date: Oct. 10, 2019

(65) Prior Publication Data
US 2021/0122869 A1    Apr. 29, 2021

(30) Foreign Application Priority Data

Apr. 4, 2018 (FR) ...................................... 1852922

(51) Int. Cl.
| | | |
|---|---|---|
| *C08G 18/12* | (2006.01) | |
| *C08G 18/64* | (2006.01) | |
| *C08G 18/66* | (2006.01) | |
| *C08G 18/76* | (2006.01) | |
| *C08G 18/79* | (2006.01) | |
| *C08K 3/26* | (2006.01) | |
| *C09J 175/08* | (2006.01) | |

(52) U.S. Cl.
CPC ......... *C08G 18/12* (2013.01); *C08G 18/6423* (2013.01); *C08G 18/6677* (2013.01); *C08G 18/7621* (2013.01); *C08G 18/7664* (2013.01); *C08G 18/792* (2013.01); *C08K 3/26* (2013.01); *C09J 175/08* (2013.01); *C08K 2003/265* (2013.01)

(58) Field of Classification Search
None
See application file for complete search history.

(56) References Cited

U.S. PATENT DOCUMENTS

| | | | | |
|---|---|---|---|---|
| 9,683,152 | B2 * | 6/2017 | Kelch et al. | 175/12 |
| 2004/0259968 | A1 * | 12/2004 | Krebs | C09J 175/04 |
| | | | | 528/84 |
| 2006/0020101 | A1 | 1/2006 | Wintermantel et al. | |
| 2015/0247075 | A1 * | 9/2015 | Thiele | C08G 18/6696 |
| | | | | 524/872 |
| 2016/0053147 | A1 * | 2/2016 | Kelch et al. | C09K 175/12 |
| 2017/0369632 | A1 * | 12/2017 | Pela | C09J 175/08 |
| 2019/0002624 | A1 | 1/2019 | Sanz | |
| 2019/0300766 | A1 * | 10/2019 | Pardal | C09J 5/00 |
| 2020/0239752 | A1 * | 7/2020 | Kaffee | F03D 1/0675 |

FOREIGN PATENT DOCUMENTS

| | | |
|---|---|---|
| EP | 1619215 A1 | 1/2006 |
| WO | 2017109382 A1 | 6/2017 |
| WO | 2018011491 A1 | 1/2018 |

OTHER PUBLICATIONS

Technical datasheet for BASF Sovermol, 8 pages, no date given. (Year: None).*
Technical datasheet for Voranol RN 490, 3 pages, no date given. (Year: None).*
Technical datasheet for Voranol RN 490, 1 page, no date given. (Year: None).*

* cited by examiner

*Primary Examiner* — Robert S Loewe
(74) *Attorney, Agent, or Firm* — NK Patent Law

(57) ABSTRACT

The invention relates to a composition comprising: an NCO component comprising: A) at least one polyurethane comprising at least two NCO terminal groups produced by an addition polymerisation reaction of at least one dissymetric diisocyanate and at least one polyol, and B) at least one polyisocyanate comprising at least three NCO isocyanate functions, selected from the group consisting of biurets, isocyanurates, adducts of diisocyanates and of triols, and the mixtures thereof; and an OH component comprising: at least one polyol; and a total content of filler(s) higher than or equal to 35 wt. %, in relation to the total weight of said OH component.

15 Claims, No Drawings

POLYURETHANE-BASED COMPOSITION

CROSS-REFERENCE TO RELATED APPLICATIONS

This application is a U.S. National Stage application of International Patent Application No. PCT/FR2019/050767, filed on Apr. 3, 2019, which claims the benefit of French Patent Application No. 1852922, filed on Apr. 4, 2018.

FIELD OF THE INVENTION

The present invention relates to a polyurethane-based composition.

The invention also relates to the use of said composition in the repair and/or the semi-structural or structural adhesive bonding of materials in the transportation, marine or construction field.

TECHNOLOGICAL BACKGROUND

Two-component polyurethane-based adhesive compositions are commonly used to obtain elevated mechanical performance qualities. These compositions can be in the form of two compositions (or components):
  one (known as —NCO component) containing the chemical entities carrying isocyanate end groups, and
  the other (known as —OH component) containing the chemical entities carrying hydroxyl end groups.

However, these polyurethane-based adhesive compositions generally exhibit the disadvantage of employing an —NCO component comprising high residual contents of diisocyanate monomers originating from the reaction for the synthesis of the polyurethane prepolymer carrying NCO groups (or having NCO end groups). This is because these residual diisocyanate monomers are capable of resulting in a number of undesirable effects. "Diisocyanate monomer" is understood to mean a hydrocarbon compound of low molar mass (of less than 300 g/mol) having two isocyanate groups. In particular, "aromatic diisocyanate monomer" is understood to mean a diisocyanate monomer as defined above, in which one of the NCO groups is connected via a covalent bond to a carbon atom forming part of an aromatic hydrocarbon ring, such as a phenyl group. In particular, "aliphatic diisocyanate monomer" is understood to mean a nonaromatic diisocyanate monomer or a diisocyanate monomer in which none of the NCO groups is connected via a covalent bond to a carbon atom forming part of an aromatic hydrocarbon ring, such as a phenyl group.

The presence of high contents of residual monomers is dangerous for the handling and the health of the users, which implies restrictions of use and the implementation of ventilation systems. The installation of these systems is not always possible, for example in the context of the adhesive bonding or repair of automobile parts (garage employees) or else in construction. Moreover, in order to take into account the undesirable effects related to the presence of these diisocyanate monomers, regulations require, for some types of products, a specific labelling of the product, if the concentration of aromatic diisocyanate monomers exceeds 0.1% by weight of the weight of the product and/or if the concentration of aliphatic diisocyanate monomers exceeds 0.5% by weight of the weight of the product, indeed even 0.1% by weight of the weight of the product.

It is thus desirable to make available to the public two-component adhesive compositions in which the —NCO component, based on polyurethane having NCO end groups, is substantially, indeed even completely, devoid of residual diisocyanate monomers and preferably in which the content of residual diisocyanate monomers is less than or equal to the abovementioned regulatory thresholds.

There exists in particular a need to provide new polyurethane-based compositions for semi-structural or structural adhesive bondings, exhibiting a low, indeed even very low (<0.1% by weight of the weight of the product), content of residual monomers.

DESCRIPTION OF THE INVENTION

In the present patent application, unless otherwise indicated:
  the amounts expressed in the percentage form correspond to weight/weight percentages;
  the number-average molecular weights (Mn), expressed in grams per mole (g/mol), are determined by calculation using the functionality (number of NCO or OH groups per mole) of the entity under consideration (polyurethane polymer having NCO end groups, diol or polyol) and the analysis of the content of end groups (NCO or OH), expressed in milliequivalents per gram (meq/g);
  the hydroxyl number of a polyol (denoted OHN) represents the number of hydroxyl functional groups per gram of polyol and is expressed in the text of the present patent application in the form of the equivalent number of milligrams of potassium hydroxide (KOH) which are used in the quantitative determination of the hydroxyl functional groups per gram of product. The OHN can be measured experimentally, for example according to the standard ISO 14900:2001. In the case of a mixture of polyols, the OHN can also be calculated from the known OHN values of each of the polyols and from their respective contents by weight in said mixture;
  the amine number of an amine represents the number of amine functional groups per gram of polyamine and is expressed in the text of the present patent application in the form of the equivalent number of milligrams of potassium hydroxide (KOH) which are used in the quantitative determination of the amine functional groups per gram of product. This index can be measured experimentally by potentiometry. In the case of a mixture of polyamines, the amine number can also be measured experimentally or calculated from the amine numbers of each of the polyamines and from their respective contents by weight in said mixture;
  "asymmetric diisocyanate monomer" is understood to mean a diisocyanate monomer, the isocyanate groups of which have different reactivities from the viewpoint of a given diol. As a general rule, such a monomer does not have an axis, plane or center of symmetry;
  the content of diisocyanate monomer is measured according to the following analytical method, which is based on the specific reaction of the isocyanate NCO group with an amine (1-(2-methoxyphenyl)piperazine or PPZ) to form stable urea derivatives. These derivatives are obtained during the preparation of the adhesive sample by dilution/dissolution of this sample using a 0.02 mol/l solution of PPZ in acetonitrile. The PZZ derivatives formed from the isocyanates present in the sample to be analyzed are subsequently quantitatively determined by a reversed-phase C18 High Performance Liquid Chromatography (HPLC) system with a mobile phase gradient comprising a mixture of water and acetonitrile buffered using a 0.2% by weight aqueous tetrabutylammonium bisulfate solution, at a pH ranging from 4 to 5, provided with an Ultra-Violet (UV) detector operating at 254 nm. These compounds are identified and quantified by comparing their retention times and their surface areas of chromatographic peaks with those of the standard PPZ derivatives obtained by reaction of a diisocyanate monomer of known nature and concentration;

the viscosity is measured using a Brookfield viscometer according to the standard ISO 2555. Preferably, the measurement carried out at 23° C. can be performed using a Brookfield RVT viscometer with a spindle suited to the viscosity range and at a rotational speed of 20 revolutions per minute (rev/min).

A. Composition

The present invention relates to a composition comprising:
  an —NCO component comprising:
    A) at least one polyurethane comprising at least two NCO end groups obtained by a polyaddition reaction:
      of at least one asymmetric diisocyanate and
      of at least one polyol,
    B) at least one polyisocyanate comprising at least three isocyanate —NCO functional groups chosen from the group consisting of biurets, isocyanurates, adducts of diisocyanates and of triols, and their mixtures;
  an —OH component comprising:
    at least one polyol;
    a total content of filler(s) of greater than or equal to 35% by weight, with respect to the total weight of said —OH component.

—OH Component

Polyol(s)

The polyol(s) used according to the invention can be chosen from those, the number-average molecular weight (Mn) of which ranges from 50 to 50 000 g/mol, preferably from 100 to 20 000 g/mol, preferentially from 500 to 20 000 g/mol and advantageously from 1000 to 5000 g/mol.

Their hydroxyl functionality can range from 2 to 6, preferentially from 2 to 3. The hydroxyl functionality is the mean number of hydroxyl functional groups per mole of polyol.

According to a specific embodiment, the —OH component comprises:
  at least one polyol P1 having a number-average molecular weight of greater than or equal to 1000 g/mol, preferably of less than or equal to 10 000 g/mol, preferentially of less than or equal to 5000 g/mol, advantageously of less than or equal to 3000 g/mol,
  at least one polyol P2 having a number-average molecular weight of less than or equal to 500 g/mol.

Polyol(s) P1

The polyol(s) P1 which can be used can be chosen from polyester polyols, polyether polyols, polyene polyols, polycarbonate polyols, poly(ether-carbonate) polyols and their mixtures.

The polyol(s) P1 which can be used can be chosen from aromatic polyols, aliphatic polyols, arylaliphatic polyols and the mixtures of these compounds.

The polyester polyols can be chosen from polyester diols and polyester triols, and preferably from polyester diols.

Mention may be made, among the polyester polyols, for example, of:
  polyester polyols of natural origin, such as castor oil;
  polyester polyols resulting from the polycondensation:
    of one or more aliphatic (linear, branched or cyclic) or aromatic polyols, such as, for example, monoethylene glycol, diethylene glycol, 1,2-propanediol, 1,3-propanediol, 1,4-butanediol, butenediol, 1,6-hexanediol, cyclohexanedimethanol, tricyclodecanedimethanol, neopentyl glycol, cyclohexanedimethanol, glycerol, trimethylolpropane, 1,2,6-hexanetriol, sucrose, glucose, sorbitol, pentaerythritol, mannitol, N-methyldiethanolamine, triethanolamine, a fatty alcohol dimer, a fatty alcohol trimer and their mixtures, with
    one or more polycarboxylic acids or an ester or anhydride derivative thereof, such as 1,6-hexanedioic acid (adipic acid), dodecanedioic acid, azelaic acid, sebacic acid, adipic acid, 1,18-octadecanedioic acid, phthalic acid, isophthalic acid, terephthalic acid, succinic acid, a fatty acid dimer, a fatty acid trimer and the mixtures of these acids, an unsaturated anhydride, such as, for example, maleic or phthalic anhydride, or a lactone, such as, for example, caprolactone;
  estolide polyols resulting from the polycondensation of one or more hydroxy acids, such as ricinoleic acid, with a diol (mention may be made, for example, of Polycin® D-1000 and Polycin® D-2000, which are available from Vertellus).

The abovementioned polyester polyols can be prepared conventionally and are for the most part commercially available.

Mention may be made, among polyester polyols, for example, of the following products with a hydroxyl functionality equal to 2:
  Tone® 0240 (sold by Union Carbide), which is a polycaprolactone with a number-average molecular weight of approximately 2000 g/mol and a melting point of approximately 50° C.,
  Dynacoll® 7381 (sold by Evonik) with a number-average molecular weight of approximately 3500 g/mol and having a melting point of approximately 65° C.,
  Dynacoll® 7360 (sold by Evonik), which results from the condensation of adipic acid with hexanediol and has a number-average molecular weight of approximately 3500 g/mol and a melting point of approximately 55° C.,
  Dynacoll® 7330 (sold by Evonik) with a number-average molecular weight of approximately 3500 g/mol and having a melting point of approximately 85° C.,
  Dynacoll® 7363 (sold by Evonik), which also results from the condensation of adipic acid with hexanediol and has a number-average molecular weight of approximately 5500 g/mol and a melting point of approximately 57° C.,
  Dynacoll® 7250 (sold by Evonik): polyester polyol having a viscosity of 180 Pa·s at 23° C., a number-average molecular weight Mn equal to 5500 g/mol and a $T_g$ equal to −50° C.,
  Kuraray® P-6010 (sold by Kuraray): polyester polyol having a viscosity of 68 Pa·s at 23° C., a number-average molecular weight Mn equal to 6000 g/mol and a $T_g$ equal to −64° C.,
  Kuraray® P-10010 (sold by Kuraray): polyester polyol having a viscosity of 687 Pa·s at 23° C. and a number-average molecular weight Mn equal to 10 000 g/mol,
  Dekatol® 3008 (sold by Bostik) with a number-average molar mass Mn in the vicinity of 1060 g/mol and the hydroxyl number of which ranges from 102 to 112 mg KOH/g. It is a product resulting from the condensation of adipic acid, diethylene glycol and monoethylene glycol.

The polyether polyol(s) which can be used according to the invention is (are) preferably chosen from polyoxyalkylene polyols, the linear or branched alkylene part of which comprises from 1 to 4 carbon atoms, more preferentially from 2 to 3 carbon atoms.

More preferably, the polyether polyol(s) which can be used according to the invention is (are) preferably chosen from polyoxyalkylene diols or polyoxyalkylene triols, the linear or branched alkylene part of which comprises from 1 to 4 carbon atoms, more preferentially from 2 to 3 carbon atoms.

Mention may be made, as examples of polyoxyalkylene diols or triols which can be used according to the invention, of:
polyoxypropylene diols or triols (also denoted by polypropylene glycol (PPG) diols or triols) having a number-average molecular weight (Mn) ranging from 1000 g/mol to 12 000 g/mol;
polyoxyethylene diols or triols (also denoted by polyethylene glycol (PEG) diols or triols) having a number-average molecular weight (Mn) ranging from 1000 g/mol to 12 000 g/mol;
and their mixtures.

The abovementioned polyether polyols can be prepared conventionally and are widely available commercially. They can be obtained by polymerization of the corresponding alkylene oxide in the presence of a basic catalyst (for example potassium hydroxide) or of a catalyst based on a double metal/cyanide complex.

Mention may be made, as examples of polyether diol, of the polyoxypropylene diol sold under the name Voranol® P 1010 by Dow with a number-average molecular weight (Mn) in the vicinity of 1020 g/mol and the hydroxyl number of which is approximately 110 mg KOH/g, or the Voranol® P2000 sold by Dow with a number-average molecular weight in the vicinity of 2040 g/mol and the hydroxyl number of which is approximately 55 mg KOH/g.

The polyene polyol(s) which can be used according to the invention can preferably be chosen from polyenes comprising hydroxyl end groups, and their corresponding hydrogenated or epoxidized derivatives.

Preferably, the polyene polyol(s) which can be used according to the invention is (are) chosen from polybutadienes comprising hydroxyl end groups, which are optionally hydrogenated or epoxidized. Preferentially, the polyene polyol(s) which can be used according to the invention is (are) chosen from butadiene homopolymers and copolymers comprising hydroxyl end groups, which are optionally hydrogenated or epoxidized.

In the context of the invention, and unless otherwise mentioned, the term "hydroxyl end groups" of a polyene polyol is understood to mean the hydroxyl groups located at the ends of the main chain of the polyene polyol.

The abovementioned hydrogenated derivatives can be obtained by complete or partial hydrogenation of the double bonds of a polydiene comprising hydroxyl end groups, and are thus saturated or unsaturated.

The abovementioned epoxidized derivatives can be obtained by chemoselective epoxidation of the double bonds of the main chain of a polyene comprising hydroxyl end groups, and thus comprise at least one epoxy group in its main chain.

Mention may be made, as examples of polyene polyols, of saturated or unsaturated butadiene homopolymers comprising hydroxyl end groups, which are optionally epoxidized, such as, for example, those sold under the name Poly BD® or Krasol® by Cray Valley.

The polycarbonate polyols can be chosen from polycarbonate diols or triols.

Mention may be made, as examples of polycarbonate diol, of:
Converge® Polyol 212-20 sold by Novomer, with a number-average molecular weight ($M_n$) equal to 2000 g/mol, the hydroxyl number of which is 56 mg KOH/g,
Polyol C1090, C-2090 and C-3090 sold by Kuraray, having a number-average molecular weight ($M_n$) ranging from 1000 to 3000 g/mol and a hydroxyl number ranging from 35 to 118 mg KOH/g.

Polyol(s) P2

Preferably, the polyol(s) P2 is (are) chosen from polyether polyols, polyester polyols and their mixtures, preferably from polyether polyols.

Preferably, the —OH component comprises at least two polyols P2, including at least one polyether triol and at least one polyether diol.

The polyol(s) P2 which can be used can be chosen from aromatic polyols, aliphatic polyols, arylaliphatic polyols and the mixtures of these compounds.

According to a preferred embodiment, the —OH component comprises:
at least one diol P2 preferably having a number-average molecular weight ranging from 50 to 500 g/mol, preferably from 50 to 350 g/mol, preferentially from 80 to 200 g/mol, said diol P2 preferably being chosen from polyether diols; and
at least one triol P2 preferably having a number-average molecular weight ranging from 200 to 500 g/mol, preferably from 300 to 500 g/mol, preferentially from 350 to 450 g/mol, said triol P2 preferably being chosen from polyether triols.

The diol(s) P2 is (are) in particular chosen from the group consisting of diethylene glycol, 2-ethyl-1,3-hexanediol, neopentyl glycol, 3-methyl-1,5-pentanediol and their mixtures.

Mention may be made, as triol P2, for example, of Voranol® CP450 sold by Dow, which is a polypropylene glycol having a functionality equal to 3 and an OHN ranging from 370 to 396 mg KOH/g.

The —OH component is preferably such that:
the total content of polyol(s) P1 can range from 5% to 30% by weight, preferably from 5% to 25% by weight, preferentially from 10% to 20% by weight, with respect to the total weight of the —OH component; and/or
the total content of polyol(s) P2 can range from 5% to 60% by weight, preferably from 5% to 50% by weight, preferentially from 5% to 40% by weight, with respect to the total weight of the —OH component.

Filler(s)

The —OH component comprises a total content of filler(s) of greater than or equal to 35% by weight, preferably of greater than or equal to 40% by weight, preferentially of greater than or equal to 45% by weight and advantageously of greater than or equal to 50% by weight, with respect to the total weight of said —OH component.

According to one embodiment, the —OH component comprises at least one filler chosen from inorganic fillers, organic fillers and their mixtures.

Use may be made, as examples of inorganic filler(s) which can be used, of any inorganic filler(s) generally used in the field of structural or semi-structural adhesives. These fillers are typically provided in the form of particles of diverse geometry. They can, for example, be spherical or fibrous or exhibit an irregular shape.

Preferably, the filler(s) is (are) chosen from the group consisting of clay, quartz, carbonate fillers, kaolin, gypsum, clays and their mixtures; preferentially, the filler(s) is (are) chosen from carbonate fillers, such as alkali metal or alkaline earth metal carbonates, and more preferentially from calcium carbonate, chalk and their mixtures.

These fillers can be untreated or treated, for example using an organic acid, such as stearic acid, or a mixture of organic acids consisting predominantly of stearic acid.

Chalk is typically extracted from natural deposits, unlike synthetic calcium carbonate.

Use may also be made of hollow inorganic microspheres, such as hollow glass microspheres, and more particularly those made of calcium sodium borosilicate or of alum inosilicate.

Use may be made, as examples of organic filler(s) which can be used, of any organic filler(s) and in particular polymeric filler(s) generally used in the field of adhesive compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may in particular be made of hollow microspheres made of vinylidene chloride/acrylonitrile.

The mean particle size of the filler(s) which can be used is preferably less than or equal to 50 microns, preferentially less than or equal to 30 microns, more preferentially less than or equal to 20 microns, advantageously less than or equal to 10 microns and in particular less than or equal to 5 microns.

The mean particle size is measured for a volume particle size distribution corresponding to 50% by volume of the sample of particles which is analyzed. When the particles are spherical, the mean particle size corresponds to the median diameter (D50 or Dv50), which corresponds to the diameter such that 50% of the particles by volume have a size which is smaller than said diameter. In the present patent application, this value is expressed in micrometers and determined according to the standard NF ISO 13320-1 (1999) by laser diffraction on an appliance of Malvern type.

According to a preferred embodiment, the —OH component comprises at least one inorganic filler, preferably at least two inorganic fillers, said inorganic filler(s) being preferentially chosen from alkali metal or alkaline earth metal carbonates, such as, for example, chalk, calcium carbonate or their mixtures.

Preferably, the —OH component comprises at least one filler chosen from calcium carbonates and in particular hydrophobized calcium carbonates, preferably having a D50 of less than or equal to 30 microns, advantageously of less than or equal to 10 microns.

According to one embodiment, the —OH component comprises:
  at least 35% by weight, preferably at least 40% by weight, preferentially at least 45% by weight and advantageously at least 50% by weight of filler(s) chosen from calcium carbonates, preferably hydrophobized calcium carbonates, preferably having a D50 of less than or equal to 30 microns, advantageously of less than or equal to 10 microns; and
  from 0% to 70%, preferably from 0% to 60%, by weight of chalk, preferentially from 40% to 60% by weight of chalk;

the percentages by weight being with respect to the total weight of the —OH component.

Mention may be made, among alkali metal or alkaline earth metal carbonates, for example, of the chalk BL 200 TB sold by Omya (DV50=9 microns), Socal 312 sold by Solvay (hydrophobized calcium carbonate with a DV50 of 1 micron) or Omya BSH sold by Omya (hydrophobized calcium carbonate).

Other Components

According to one embodiment, the —OH component comprises at least one polyamine comprising at least one primary or secondary amine functional group.

The polyamine can have a number-average molecular weight ranging from 60 g/mol to 5000 g/mol, preferably from 100 g/mol to 3000 g/mol, preferentially from 400 g/mol to 2000 g/mol and advantageously from 400 g/mol to 1000 g/mol.

According to one embodiment, the polyamine corresponds to one of the formulae (I-1), (I-2) or (I-3) below:

(I-1)

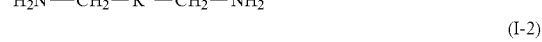
(I-2)

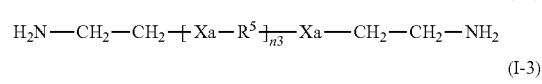
(I-3)

in which:
  $R^4$ is a bond, a linear or branched divalent alkylene radical or a divalent arylene radical comprising from 1 to 18 carbon atoms;
  $R^5$ represents a linear or branched divalent alkylene radical comprising from 2 to 12 carbon atoms, preferentially ethylene or propylene,
  $R^6$ represents a linear or branched divalent alkylene radical comprising from 2 to 10 carbon atoms, preferentially ethylene or propylene,
  $X_a$=O, S, $NR^7$ in which $R^7$ represents H or a saturated or unsaturated and linear or branched alkyl group comprising from 1 to 10 carbon atoms, preferentially from 1 to 4 carbon atoms, X preferably representing O;
  $n_3$ is an integer ranging from 0 to 4 and advantageously being equal to 1 or 2;
  $n_4$ is an integer ranging from 0 to 2 and advantageously being equal to 1.

Preferably, the polyamine is chosen from diethylenediamine (EDA): $H_2N$—$CH_2$—$CH_2$—$NH_2$, diethylenetriamine (DETA): $H_2N$—$CH_2$—$CH_2$—NH—$CH_2$—$CH_2$—$NH_2$, 1,10-decanediamine: $H_2N$—$(CH_2)_{10}$—$NH_2$, 1,12-dodecanediamine: $H_2N$—$(CH_2)_{12}$—$NH_2$, 1,6-hexamethylenediamine (NMDA), the polyetherdiamines of formulae $H_2N$—$CH_2$—$CH_2$—O—$CH_2$—$CH_2$—O—$CH_2$—$CH_2$—$NH_2$ and $H_2N$—$CH_2$—$CH_2$—$CH_2$—O—$CH_2$—$CH_2$—O—$CH_2$—$CH_2$—$CH_2$—$NH_2$ (available, for example, under the respective trade names Jeffamine® EDR 148 and Jeffamine® EDR 176 from Huntsman).

According to one embodiment, the polyamine is chosen from the group consisting of polyetheramines, polyamidoamines, fatty amine dimers or trimers, polyethyleneimines (PEI), polyethyleneimine dendrimers, polypropyleneimines (PPI), polypropyleneimine dendrimers, polyallylamines, poly(propylene-ethylene)imines and their mixtures, said polyamine preferably having an amine number ranging from 20 to 1870 mg KOH/g, preferably from 50 to 1000 mg KOH/g, preferentially from 100 to 800 mg KOH/g and advantageously from 180 to 250 mg KOH/g.

According to one embodiment, the polyamine is chosen from polyetheramines, in particular chosen from:
polyetherdiamines, such as, for example:
polyetherdiamines corresponding to the formula below:

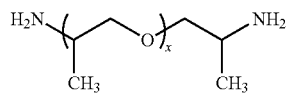

in which x is an integer, preferably ranging from 1 to 50 (such polyetherdiamines are, for example, sold under the names Jeffamine D-230, D-400, D-2000 and D-4000 by Huntsman);
polyetherdiamines corresponding to the formula below:

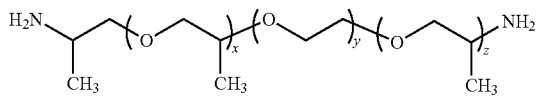

in which x, y and z are integers, with x+z preferably ranging from 1 to 6 (such polyetherdiamines are, for example, sold under the names Jeffamine HK-511, ED-600, ED-900 and ED-2003 by Huntsman);

polyethertriamines, such as, for example, those corresponding to the formula below:

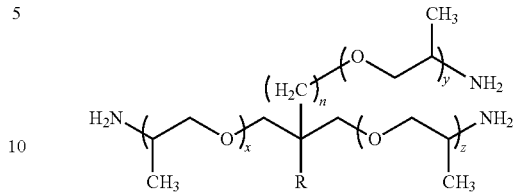

in which R is a hydrogen atom or a $C_1$ to $C_2$ alkyl group and x, y, z and n are integers, preferably n ranging from 0 to 1 and x+y+z ranging from 5 to 85 (such polyethertriamines are sold, for example, under the names Jeffamine T-403, T-3000 and T-5000 by Huntsman).

According to another embodiment, the polyamine is chosen from fatty amine dimers and trimers preferably comprising two or three primary amine groups having an amine number ranging from 184 to 291 mg KOH/g. These fatty amine dimers and trimers can be obtained from corresponding dimerized and trimerized fatty acids. Mention may be made, as examples of such partially or completely hydrogenated fatty amine dimers, of those corresponding to the following formulae:

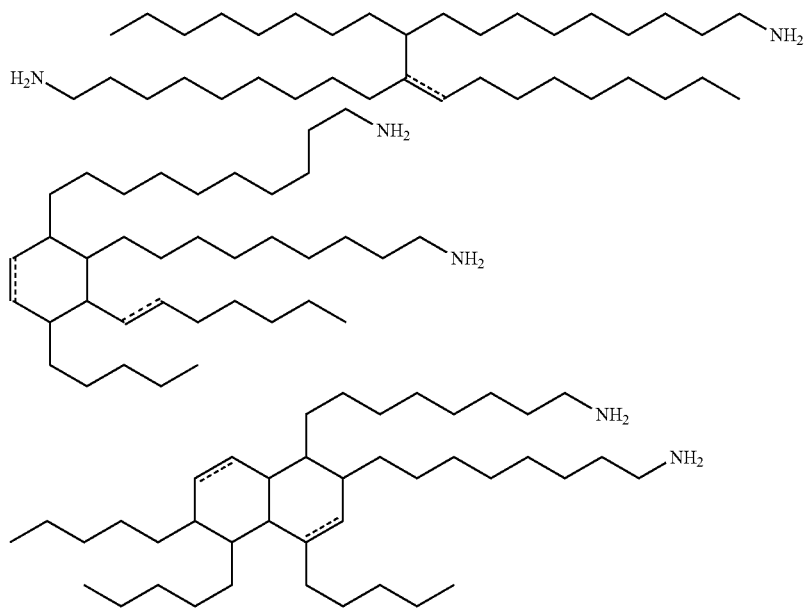

polyetherdiamines corresponding to the following formula:

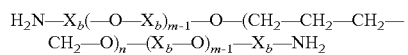

in which $X_b$ is a linear or branched alkylene group preferably comprising from 2 to 20 carbon atoms, preferably from 2 to 10 carbon atoms, m is an integer ranging from 1 to 20 and n is an integer ranging from 1 to 100;

The fatty acid dimers and trimers used to prepare the abovementioned fatty amines can be obtained by high-temperature polymerization under pressure of unsaturated monocarboxylic fatty acids (acid monomer) comprising from 6 to 22 carbon atoms, preferably from 12 to 20 carbon atoms, and originate from plant or animal sources. Mention may be made, as examples of such unsaturated fatty acids, of O18 acids having one or two double bonds (respectively oleic acid or linoleic acid) obtained from tall oil, which is a byproduct of the manufacture of paper pulp. After polymerization of these unsaturated fatty acids, an industrial mixture is in particular obtained which contains, on average, 30-35% by weight of monocarboxylic fatty acids, often isomerized, with respect to the starting unsaturated monocarboxylic fatty acids, 60-65% by weight of dicarboxylic acids (acid dimers) comprising twice the carbon number, with respect to the starting unsaturated monocarboxylic fatty acids, and 5-10% by weight of tricarboxylic acids (acid trimers) having three times the carbon number, with respect to the starting unsaturated monocarboxylic fatty acids. The different commercial grades of acid dimers, monomers or trimers are obtained in particular by purification of this mixture. These fatty acid dimers and trimers are subsequently typically subjected to a reductive ammoniation ($NH_3/H_2$) reaction in the presence of a catalyst, making it possible to obtain the dimerized fatty amines.

Preferably, the —OH component comprises at least one polyamine chosen from fatty amine dimers and trimers.

The —OH component can comprise a total content of polyamine(s) ranging from 0.1% to 6% by weight, preferably from 0.5% to 5% by weight, preferentially from 1% to 4% by weight, with respect to the total weight of said —OH component.

The —OH component can comprise at least one additive chosen from the group consisting of plasticizers, catalysts, solvents, pigments, adhesion promoters, moisture absorbers, UV stabilizers (or antioxidants), dyes and their mixtures.

According to one embodiment, the —OH component comprises at least one catalyst. It can be any type of catalyst used in this field.

Preferably, the —OH component comprises at least one catalyst chosen from the group consisting:
of organometallic catalysts, preferably with the exception of tin-based catalysts;
of tertiary amines; and
of their mixtures.

In the context of the invention, the term "organometallic catalysts, with the exception of tin-based catalysts" is understood to mean organometallic catalysts not comprising tin.

It may concern a mixture of catalysts of one and the same family (for example a mixture of several tertiary amines or a mixture of several organometallic compounds comprising different metal atoms) or a mixture of catalysts of different families (for example a mixture of a tertiary amine and of an organometallic compound).

In the context of the invention, the term "organometallic catalysts" is understood to mean catalysts comprising an organic radical and at least one metal.

In the context of the invention, the term "organic radical" is understood to mean a radical comprising at least one carbon atom.

The organometallic compounds can comprise organometallic compounds (compounds comprising at least one metal-carbon covalent bond), metal alkoxides, metal carboxylates and metal coordination complexes with one or more organic ligands.

Mention may be made, as example of organic ligand, of acetylacetonate.

The metal atom of the organometallic compounds can be any metal atom known to a person skilled in the art, preferably with the exception of tin, and can in particular be chosen from aluminum, manganese, silver, copper, gold, platinum, palladium, ruthenium, rhodium, molybdenum, zinc, cobalt, iron, nickel, bismuth, titanium or zirconium. Preferably, the metal atom of the organometallic compounds is chosen from aluminum, zinc, iron, bismuth, titanium, gold and zirconium.

The organometallic catalysts can comprise several metal atoms, such as, for example, bismuth and zinc.

Preferably, the organometallic catalysts are catalysts based on bismuth and/or zinc.

In the context of the invention, the term "bismuth-based catalyst" is understood to mean a catalyst comprising bismuth. Such a catalyst can thus comprise other metal atoms in addition to bismuth, such as, for example, zinc.

In particular, the organometallic catalysts, and in particular the bismuth-based catalysts, comprise exclusively bismuth as metal atom (bismuth catalysts).

The organometallic compounds (compounds comprising at least one metal-carbon covalent bond) can be carboxylates of organometallic compounds.

The metal alkoxides can be chosen from the group consisting of titanium tetrabutoxide, titanium tetraisopropoxide, zirconium tetrabutoxide, zirconium tetraisopropoxide, bismuth phenoxide and their mixtures.

The metal carboxylates can be those in which the carboxylic acid contains from 2 to 20 carbon atoms, preferably from 4 to 14 carbon atoms. Mention may be made, for example, as carboxylic acids, of butyric acid, isobutyric acid, caproic acid, caprylic acid, 2-ethylhexanoic acid, capric acid, lauric acid, myristic acid, palmitic acid, stearic acid, isostearic acid, abietic acid, neodecanoic acid, 2,2,3,5-tetramethylhexanoic acid, 2,4-dimethyl-2-isopropylpentanoic acid, 2,5-dimethyl-2-ethylhexanoic acid, 2,2-dimethyloctanoic acid, 2,2-diethylhexanoic acid and arachidic acid.

The metal carboxylates can be monocarboxylates, dicarboxylates, tricarboxylates or their mixtures.

The metal carboxylates can be chosen from the group consisting of zinc-based carboxylates, bismuth-based carboxylates, bismuth/zinc-based carboxylates and their mixtures, the metal carboxylates being in particular chosen from the group consisting of zinc carboxylates, bismuth carboxylates, bismuth/zinc carboxylates and their mixtures.

Mention may be made, among bismuth carboxylates, for example, of Borchi® KAT 320 (CAS number: 67874-71-9, bismuth 2-ethylhexanoate) and Borchi® KAT 315 (CAS number: 34364-26-6, bismuth neodecanoate), which are available from Borchers, KKAT XK-651, available from King Industries, KK KKAT XC-B221, available from King Industries, and Coscat 83 (bismuth neodecanoate, neodecanoic acid), available from Vertellus.

Mention may be made, among zinc carboxylates, for example, of Borchi® KAT 0761 (CAS number: 27253-29-8, zinc neodecanoate), available from Borchers, or TIB KAT 616 (zinc neodecanoate), available from TIB Chemicals.

The catalyst is preferably chosen from metal carboxylates and more particularly zinc-based carboxylates, bismuth-based carboxylates, bismuth/zinc-based carboxylates and their mixtures. In particular, the catalyst is chosen from bismuth 2-ethylhexanoate, zinc 2-ethylhexanoate, bismuth neodecanoate, zinc neodecanoate, bismuth/zinc 2-ethylhexanoate, bismuth/zinc neodecanoate and their mixtures.

The metal coordination complexes with one or more organic ligands can be chosen from the group consisting of zinc acetylacetonate, titanium acetylacetonate (for example commercially available under the name Tyzor® AA75 from Dorf Ketal), titanium tetraacetylacetonate, aluminum trisacetylacetonate, aluminum chelates, such as, for example, the monoacetylacetonate bis(ethyl acetoacetate) (for example commercially available under the name K-KAT® 5218 from King Industries), zirconium tetraacetylacetonate, diisopropoxybis(ethylacetonato)titanium and their mixtures.

Preferably, the tertiary amines are chosen from the group consisting of triethylamine, tributylamine, N,N-dimethylcyclohexylamine, dimethylbenzylamine, N,N'-dim ethylpiperazine, N,N,N,N-tetramethylpropane-1,3-diamine, bis(2-dimethylaminoethyl) ether, 2-dimethylaminoethyl 3-dimethylaminopropyl ether, N-methylmorpholine, N-ethylmorpholine, N-(methoxyethyl)morpholine, 2,2'-dimorpholinodiethyl ether (DMDEE), bis(2,6-dimethylmorpholinoethyl) ether, bis(3,5-dimethylmorpholinoethyl) ether, N,N-dimethylphenylamine, N,N,N,N-tetramethylbutane-1,3-diamine, N,N,N,N-tetramethylpropane-1,3-diamine, N,N,N,N-tetramethylhexane-1,6-diamine, 1-methylimidazole, 2-methyl-1-vinylimidazole, 1-allylimidazole, 1-phenylimidazole, 1,2,4,5-tetramethylimidazole, pyrimidazole, 4-(dimethylamino)pyridine, 4-pyrrolidinopyridine, 4-morpholinopyridine, 4-methylpyridine, N-decyl-2-methylimidazole, N-dodecyl-2-methylimidazole, tris(dimethylaminopropyl)hexahydrotriazine, tetramethylguanidine, 1,8-diazabicyclo[5.4.0]undec-7-ene (DBU), 1,4-diazabicyclo[2.2.2]octane (DABCO), 1,5-diazabicyclo[4.3.0]non-5-ene (DBN), quinuclidine, bis(dimethylaminomethyl)phenol, 2-(2-dimethylaminoethoxy)ethanol, quinuclidinol, (hydroxymethyl)quinuclidinol and their mixtures.

In particular, the tertiary amines are chosen from 1,8-diazabicyclo[5.4.0]undec-7-ene (DBU), 1,5-diazabicyclo[4.3.0]non-5-ene (DBN), 2,2'-dimorpholinodiethyl ether (DMDEE), 1,4-diazabicyclo[2.2.2]octane (DABCO) and their mixtures.

According to a preferred embodiment, the —OH component comprises a catalyst chosen from organometallic catalysts, in particular from organometallic catalysts based on bismuth and/or zinc, such as, for example, zinc-based carboxylates, bismuth-based carboxylates, bismuth/zinc-based carboxylates or their mixtures and advantageously from zinc carboxylates, bismuth carboxylates, bismuth/zinc carboxylates and their mixtures.

The —OH component can comprise a total amount of catalyst(s) ranging from 0.01% to 5% by weight, preferentially from 0.05% to 5% by weight, advantageously from 0.05% to 3% by weight, with respect to the total weight of the —OH component.

According to one embodiment, the —OH component has a viscosity, measured at ambient temperature (23° C.), ranging from 10 to 150 000 mPa·s, preferably ranging from 20 000 to 100 000 mPa·s.

—NCO Component

The composition according to the invention comprises an —NCO component comprising:
A) at least one polyurethane comprising at least two NCO end groups obtained by a polyaddition reaction:
of at least one asymmetric diisocyanate and
of at least one polyol,
B) at least one polyisocyanate comprising at least three isocyanate —NCO functional groups chosen from the group consisting of biurets, isocyanurates, adducts of diisocyanates and of triols, and their mixtures.

A) Polyurethane Having NCO End Groups

The —NCO component can comprise a total amount of polyurethane(s) comprising at least two NCO end groups mentioned above ranging from 60% to 95% by weight, preferably from 60% to 90% by weight and advantageously from 65% to 85% by weight, with respect to the total weight of the —NCO component.

The asymmetric diisocyanate monomer(s) which can be used to prepare the polyurethane having NCO end groups A) used according to the invention can be aliphatic or aromatic.

According to one embodiment, the asymmetric diisocyanate monomer(s) is (are) chosen from the group consisting:
of isophorone diisocyanate (IPDI);
of toluene diisocyanate (TDI) and in particular of 2,4-toluene diisocyanate;
of the hydrogenated form of TDI and in particular of the hydrogenated form of 2,4-toluene diisocyanate and/or the hydrogenated form of 2,6-TDI:

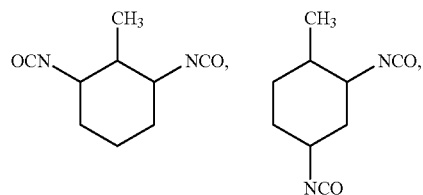

of 2,4'-diphenylmethane diisocyanate (2,4'-MDI);
of the hydrogenated form of 2,4'-diphenylmethane diisocyanate (2,4'-MDI); and
of their mixtures.

In particular, it (they) can be used in the form of a composition of diisocyanates comprising at least 90% by weight and preferably at least 95% by weight, with respect to the weight of said composition, of an asymmetric diisocyanate monomer.

More preferentially, the asymmetric diisocyanate monomer(s) is (are) chosen from the 2,4'-MDI isomer, the 2,4-TDI isomer, a mixture of MDI isomers comprising 90% by weight at least and preferably comprising 95% by weight at least of 2,4'-MDI isomer, or a mixture of TDI isomers comprising 90% by weight at least and preferably comprising 95% by weight at least of 2,4-TDI isomer, said percentages being expressed respectively with respect to the weight of the mixture of isomers.

The asymmetric diisocyanate monomer(s) which can be used to prepare the abovementioned polyurethane comprising at least two NCO groups A) is (are) typically commercially available.

The polyol(s) which can be used to prepare the abovementioned polyurethane A) is (are) preferably chosen from polyether polyols (preferably polyether diols), polyester polyols (preferably polyester diols) and their mixtures.

The mixtures of polyether polyol(s) and of polyester polyol(s) can be:
a mixture of polyether polyols of different natures;
a mixture of polyester polyols of different natures; or
a mixture of at least one polyether polyol and at least one polyester polyol.

Preferably, the polyurethane A) is prepared from a mixture of at least one polyether polyol, preferably polyether diol, and of at least one polyester polyol, preferably polyester diol.

The polyol(s) which can be used to prepare the abovementioned polyurethane A) can be chosen from those, the number-average molecular weight Mn of which is less than or equal to 5000 g/mol, preferably less than or equal to 4000 g/mol, advantageously less than or equal to 3000 g/mol, and more preferentially those, the number-average molecular weight Mn of which ranges from 400 to 2500 g/mol.

Preferably, the polyol(s) which can be used to prepare the abovementioned polyurethane A) exhibit(s) a hydroxyl number (OHN) ranging from 28 to 281 mg KOH/g, preferably from 100 to 281 mg KOH/g.

The polyether polyol(s) which can be used to prepare the abovementioned polyurethane A) is (are) preferably chosen from polyoxyalkylene polyols (preferably polyoxyalkylene diols), the (saturated) linear or branched alkylene part of which comprises from 2 to 4 carbon atoms and preferably from 2 to 3 carbon atoms.

Preferably, the polyether polyol(s) which can be used to prepare the abovementioned polyurethane A) is (are) chosen from polyoxypropylene polyols having a polydispersity index ranging from 1 to 1.4, in particular ranging from 1 to 1.3. This index corresponds to the ratio of the weight-average molecular weight Mw to the number-average molecular weight Mn of the polyether polyol (P1=Mw/Mn), determined by GPC.

Preferably, the polyether polyol(s) which can be used to prepare the polyurethane A) has (have) an OHN ranging from 50 to 281 mg KOH/g.

The abovementioned polyether polyol(s) can be prepared in a conventional way and/or is (are) typically available commercially, as illustrated in the examples.

The polyester polyol(s), preferably polyester diols, which can be used to prepare the abovementioned polyurethane A) can be chosen from:
- polyester polyols resulting from the polycondensation of at least one dicarboxylic acid, or of at least one of its corresponding anhydrides or diesters, with at least one diol,
- polyester polyols resulting from a polymerization with ring opening of at least one cyclic lactone with at least diol, such as polycaprolactone polyols.

The dicarboxylic acid(s) which can be used for the synthesis of the abovementioned polyester polyols can be linear or branched, cyclic or acyclic, saturated or unsaturated and aromatic or aliphatic and preferably comprise from 3 to 40 carbon atoms and more preferentially from 5 to 10 carbon atoms. It may, for example, be a matter of adipic acid, phthalic acid, succinic acid or their mixtures.

The diol(s) which can be used for the synthesis of the abovementioned polyester polyols can be chosen from polyalkylene diols, polyoxyalkylene diols and the mixtures of these compounds, the (saturated) alkylene part of these compounds preferably being linear or branched and preferably comprising from 2 to 40 carbon atoms and more preferentially from 2 to 8 carbon atoms. It may, for example, be a matter of monoethylene glycol, diethylene glycol, 1,2-propanediol, 1,3-propanediol, 1,4-butanediol, 1,6-hexanediol or their mixtures.

The cyclic lactone(s) which can be used for the synthesis of the abovementioned polyester polyols preferably comprise from 3 to 7 carbon atoms.

Preferably, the polyester polyol(s) which can be used to prepare the abovementioned polyurethane A) has (have) an OHN ranging from 90 to 281 mg KOH/g, preferentially from 90 to 280 mg KOH/g and advantageously from 90 to 150 mg KOH/g.

The polyester polyol(s) which can be used to prepare the abovementioned polyurethane A) can be prepared in a conventional way and/or is (are) typically available commercially, as illustrated in the examples.

According to one embodiment, the abovementioned polyurethane A) is obtained from:
- a mixture of polyoxyalkylene polyols, the (saturated) linear or branched alkylene part of which comprises from 2 to 4 carbon atoms and preferably from 2 to 3 carbon atoms, said polyoxyalkylene polyols preferably each having an OHN ranging from 50 to 281 mg KOH/g;

a mixture of:
- polyester polyol(s) as defined above and having in particular an OHN ranging from 90 to 281 mg KOH/g, preferably from 200 to 281 mg KOH/g; and
- polyoxyalkylene diol(s), the (saturated) linear or branched alkylene part of which comprises from 2 to 4 carbon atoms and preferably from 2 to 3 carbon atoms, said polyoxyalkylene diol(s) preferably having an OHN ranging from 50 to 281 mg KOH/g, preferably from 90 to 150 mg KOH/g.

Preferably, the amounts of asymmetric diisocyanate monomer(s) and of polyol(s) used in the synthesis of the abovementioned polyurethane A) are such that the NCO/OH molar ratio, denoted $r_1$, ranges from 1.5 to 2, more preferentially from 1.6 to 1.9.

This ratio $r_1$ corresponds to the ratio of the number of —NCO groups (present in the total amount of asymmetric diisocyanate(s) used to synthesize the polyurethane having NCO end groups A)) to the number of —OH groups (present in the total amount of polyol(s) used to synthesize the polyurethane having NCO end groups A)).

The amounts by weight of diisocyanate monomer(s) and of polyol(s) to be charged to the reactor are determined in particular on the basis of this ratio and also the hydroxyl number OHN of the polyol or of the mixture of polyols, measured experimentally or calculated from the OHN values of the polyols present and from their respective contents by weight in said mixture.

The polyurethane A) as defined above can be prepared in the presence or absence of at least one reaction catalyst, preferentially at a reaction temperature T1 of less than 95° C. and preferably ranging from 65° C. to 80° C., and preferably under anhydrous conditions.

The combined conditions described above for obtaining the polyurethane A) advantageously make it possible to obtain a concentration of unreacted diisocyanate monomer(s) which is low enough at the end of the reaction for the polyurethane A) to be able to be used directly after its synthesis in the preparation of the —NCO component, without it being necessary to treat it, for example by purification, distillation or selective extraction processes as employed in the prior art, in order to remove or reduce the excess of unreacted diisocyanate monomer(s) present in the reaction product.

The —NCO component obtained can thus comprise a content of aliphatic diisocyanate monomer(s) of less than or equal to 0.5% by weight (preferably of less than or equal to 0.1%), with respect to the weight of the —NCO component, and a content of aromatic diisocyanate monomer(s) of less than or equal to 0.1% by weight, with respect to the weight of the —NCO component.

B) Polyisocyanate Comprising at Least Three Isocyanate —NCO Functional Groups

The —NCO component can comprise a total content of polyisocyanate(s) comprising at least three —NCO functional groups B) ranging from 5% to 60% by weight, preferably from 10% to 60% by weight, preferentially from 10% to 50% by weight and advantageously from 10% to 40% by weight, with respect to the total weight of the —NCO component.

The —NCO component comprises at least one polyisocyanate comprising at least three isocyanate —NCO functional groups, said polyisocyanate being chosen from the group consisting of biurets, isocyanurates, adducts of diisocyanates and of triols, and their mixtures.

The polyisocyanate B) according to the invention can be chosen from a monomeric polyisocyanate, an oligomeric polyisocyanate, a polymeric polyisocyanate or their mixtures.

The oligomeric polyisocyanates are typically mixtures of polyisocyanates having different degrees of oligomerization.

For example, the abovementioned polyisocyanate B) can be chosen from monomeric, oligomeric and polymeric biurets. In particular, the biurets are mixtures comprising triisocyanate (monomeric) biurets, oligomeric biurets and possibly polymeric biurets.

In particular, the isocyanurate(s) can be used in the form of an industrial mixture of (poly)isocyanurate(s) with a purity of greater than or equal to 70% by weight of isocyanurate(s), with respect to the weight of said mixture.

Preferably, the diisocyanate isocyanurate(s) which can be used according to the invention correspond(s) to the following general formula (I):

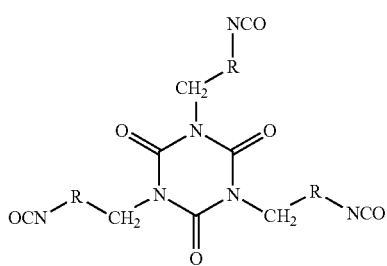

in which:

R represents a linear, branched or cyclic and aliphatic or aromatic alkylene group comprising from 4 to 9 carbon atoms, with the proviso that the NCO groups are not connected by a covalent bond to a carbon atom forming part of an aromatic hydrocarbon ring, such as a phenyl group.

Mention may be made, as examples of diisocyanate isocyanurate(s) which can be used according to the invention, of:

hexamethylene diisocyanate (HDI) isocyanurate having the following formula:

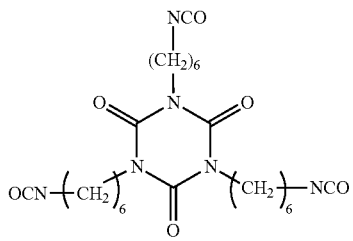

isophorone diisocyanate (IPDI) isocyanurate having the following formula:

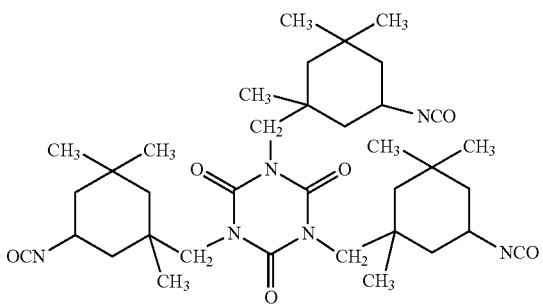

pentamethylene diisocyanate (PDI) isocyanurate having the following formula:

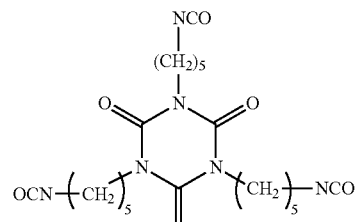

meta-xylylene diisocyanate (m-XDI) isocyanurate having the following formula:

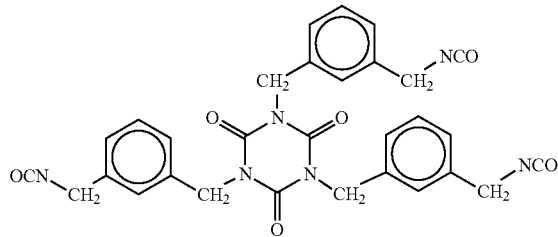

m-XDI isocyanurate in hydrogenated form having the following formula:

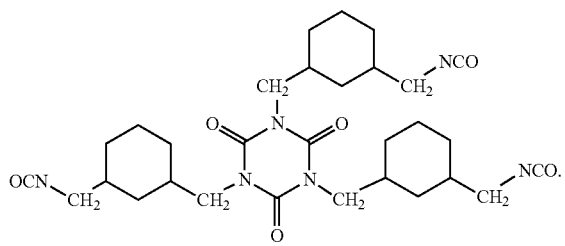

The diisocyanate(s) which can be used to prepare the adducts of diisocyanate and triol is (are) preferably chosen from aromatic or aliphatic diisocyanate monomers and their mixtures, and more preferentially aliphatic diisocyanate monomers. The diisocyanate monomer(s) can be in the form of a pure isomer or in the form of a mixture of isomers.

Mention may be made, as triols which can be used to prepare the adducts of diisocyanate and triol, for example, of glycerol, trimethylolmethane (TMM), trimethylolethane (TME) and trimethylolpropane (TMP). Preferably, TMP is used.

Mention may be made, as example of adducts of diisocyanates and of triols which can be used according to the invention, of the adduct of meta-xylylene diisocyanate and of trimethylolpropane, as represented below.

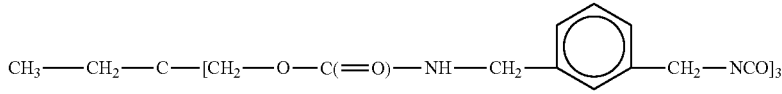

Typically, the oligomeric polyisocyanates are provided in the form of mixtures with different degrees of oligomerization and/or chemical structures. Preferably, these mixtures have a mean NCO functionality of greater than or equal to 3.

The biurets are provided in particular in the form of mixtures, predominantly comprising a monomeric triisocyanate, and oligomeric polyisocyanates having an NCO functionality of greater than 3.

The biurets can be monomeric, oligomeric or polymeric biurets of hexamethylene diisocyanate (HDI), isophorone diisocyanate (IPDI), pentamethylene diisocyanate (PDI), meta-xylylene diisocyanate (m-XDI) or hydrogenated meta-xylylene diisocyanate (m-HXDI).

According to one embodiment, the —NCO component comprises B) a mixture of polyisocyanates, said polyisocyanates each comprising at least three NCO functional groups, the mean NCO functionality of said mixture of polyisocyanates being greater than or equal to 3, preferably greater than or equal to 3.5.

The term "mean NCO functionality of a mixture" is understood to mean the mean number of NCO functional groups per mole of mixture.

Mention may be made, among the polyisocyanates B) according to the invention, for example, of:
HDI biurets, for example sold by Bayer under the names Desmodur® N100 and N3200, or those sold by Vencorex under the names Tolonate® HDB and HDB-LV,
HDI isocyanurates, for example sold by Bayer under the names Desmodur® N3300, N3600 and N3790BA, or those sold by Vencorex under the names Tolonate® HDT, HDT-LV and HDT-LV2.

According to a preferred embodiment, the abovementioned polyisocyanate B) is chosen from isocyanurates and in particular corresponds to an HDI isocyanurate.

The —NCO component can comprise a content by weight of NCO groups ranging from 5% to 25% and preferably from 10% to 20% by weight, with respect to the total weight of said —NCO component.

The —NCO component can be prepared by simple mixing of its ingredients at a temperature of less than or equal to 85° C. and preferably ranging from 60° C. to 80° C., preferentially under anhydrous conditions.

According to a preferred embodiment, the —NCO component according to the invention comprises:
from 60% to 95% by weight, preferably from 65% to 85% by weight, of polyurethane(s) A) as defined above; and
from 10% to 60% by weight, preferably from 15% to 35% by weight, of polyisocyanate(s) comprising at least three isocyanate —NCO functional groups B) as defined above.

Additives

The —NCO component can comprise at least one additive chosen from the group consisting of plasticizers, catalysts, solvents, pigments, adhesion promoters, moisture absorbers, UV stabilizers (or antioxidants), dyes, fillers, rheological agents and their mixtures.

The total content of abovementioned additive(s) in the —NCO component can range from 0% to 35% by weight, preferably from 0% to 20% by weight, advantageously from 0% to 15% by weight and more advantageously still from 0% to 10% by weight, with respect to the total weight of said —NCO component.

Preferably, the —NCO component does not comprise a solvent, it being possible for said solvent to be an organic solvent, such as ethyl acetate, methyl ethyl ketone, tetrahydrofuran, methyltetrahydrofuran, or else from Isane® (based on isoparaffins, available from Total) or Exxol® D80 (based on aliphatic hydrocarbons, available from ExxonMobil Chemical) or else chlorobenzene, naphtha, acetone, n-heptane or xylene.

According to one embodiment, the —NCO component has a viscosity, measured at ambient temperature (23° C.), ranging from 100 to 150 000 mPa·s, preferably ranging from 1000 to 50 000 mPa·s.

Preferably, the abovementioned —NCO component comprises:
A) at least one polyurethane comprising at least two NCO end groups obtained by a polyaddition reaction:
of at least one asymmetric diisocyanate, preferably toluene diisocyanate (TDI) (in the form of a single isomer or of a mixture of isomers);
of a mixture of polyols, and in particular of a mixture of at least one polyether diol with at least one polyester diol as are defined above, or a mixture of two polyether diols;
B) at least one polyisocyanate comprising at least three isocyanate —NCO functional groups chosen from isocyanurates, biurets and their mixtures;
the total amount of abovementioned polyurethane(s) A) ranging from 60% to 90% by weight of the —NCO component, preferably from 65% to 85% by weight, with respect to the total weight of the —NCO component; and
the total amount of abovementioned polyisocyanate B) ranging from 10% to 40% by weight, preferably from 15% to 35% by weight, with respect to the total weight of the —NCO component.

Composition

Preferably, the composition according to the invention is an adhesive composition.

According to one embodiment of the invention, the —OH component/—NCO component ratio by volume within the composition ranges from 1/3 to 3/1, preferably from 1/2 to 2/1, said ratio by volume advantageously being equal to 1/1 or to 1/2.

The composition according to the invention advantageously exhibits at least one of the following properties:
reduced, indeed even zero, content of residual diisocyanate monomers, and thus advantageously nontoxic and nonhazardous;

results, after crosslinking, in an adhesive seal exhibiting semi-structural or structural properties.

The composition according to the invention advantageously results in an adhesive seal having:
- a modulus of rupture of greater than or equal to 5 MPa; and/or
- an elongation at break of greater than or equal to 80%, preferably of greater than or equal to 90%, preferentially of greater than or equal to 100%.

B. Ready-for-Use Kit

The present invention also relates to a ready-for-use kit, comprising the —OH component as defined above, on the one hand, and the —NCO component as defined above, on the other hand, packaged in two separate compartments.

This is because the composition according to the invention can be in a two-component form, for example within a ready-for-use kit, comprising the —NCO component, on the one hand, in a first compartment or drum and the —OH component, on the other hand, in a second compartment or drum, in proportions suitable for direct mixing of the two components, for example using a metering pump.

According to one embodiment of the invention, the kit additionally comprises one or more means making possible the mixing of the —NCO and —OH components. Preferably, the mixing means are chosen from metering pumps or static mixers with a diameter suited to the amounts used.

C. Uses

The present invention also relates to the use of a composition as defined above as adhesive, sealant or coating, preferably as adhesive.

The invention also relates to the use of said composition in the repair and/or the structural or semi-structural adhesive bonding of materials in the transportation, motor vehicle (car, bus or truck), marine or construction field.

The present invention also relates to a method for assembling two substrates by adhesive bonding, comprising:
- the coating, onto at least one of the two substrates to be assembled, of an adhesive composition obtained by mixing the —OH and —NCO components as defined above; then
- actually bringing the two substrates into contact.

The appropriate substrates are, for example, inorganic substrates, such as concrete, metals or alloys (such as aluminum alloys, steel, non-ferrous metals and galvanized metals); or else organic substrates, such as wood, plastics, such as PVC, polycarbonate, PMMA, polyethylene, polypropylene, polyesters, epoxy resins; substrates made of metal and composites coated with paint.

All the embodiments described above can be combined with one another. In particular, the different abovementioned constituents of the composition and in particular the preferred embodiments of the composition can be combined with one another.

In the context of the invention, the term "of between x and y" or "ranging from x to y" is understood to mean an interval in which the limits x and y are included. For example, the range "of between 0% and 25%" includes in particular the values 0% and 25%.

The invention is now described in the following implementational examples, which are given purely by way of illustration and should not be interpreted in order to limit the scope thereof.

EXAMPLES

The following ingredients were used:

Voranol™ P1000, sold by Dow, is a polypropylene glycol (PPG) of functionality F=2 having an OHN of 112 mg KOH/g.

Voranol™ P2000, sold by Dow, is a polypropylene glycol (PPG) of functionality F=2 having an OHN of 55 mg KOH/g, i.e. a number-average molecular weight (Mn) in the vicinity of 2040 g/mol.

Borchi® KAT 315, sold by Borchers: bismuth neodecanoate used as tin-free catalyst.

Scuranate® T100, sold by Vencorex and corresponding to a mixture of TDI isomers comprising at least 99% by weight of 2,4-TDI isomer. Its NCO percentage is 48.1%.

Voranol® P400, sold by Dow, is a polypropylene glycol of functionality F=2 having a mean hydroxyl number of 260 mg KOH/g, i.e. a number-average molecular weight (Mn) in the vicinity of 432 g/mol.

Voranol® CP450, sold by Dow and corresponding to a polyether triol (polyoxypropylene triol obtained from glycerol and propylene oxide), the hydroxyl number of which is approximately 383 mg KOH/g.

Dekatol® 3008, manufactured by Bostik, is a polyester polyol of functionality equal to 2, with a number-average molar mass Mn in the vicinity of 1060 g/mol and the hydroxyl number of which ranges from 102 to 112 mg KOH/g. It is a product resulting from the condensation of adipic acid, diethylene glycol and monoethylene glycol.

Desmodur® N3300, sold by Covestro and corresponding to an HDI trimer assaying on average at 21.8% by weight of NCO group, with respect to the weight of said commercial product.

EHD, sold by Sigma-Aldrich, is 2-ethyl-1,3-hexanediol having an OHN=767 mg KOH/g.

DEG, sold by Sigma-Aldrich, is ethylene glycol having an OHN=1808 mg KOH/g.

Priamine® 1071, sold by Croda, is a fatty amine dimer with an amine number of 205 mg KOH/g.

Socal® 312, sold by Solvay, is a precipitated calcium carbonate having a DV50 equal to approximately 1 µm.

Omya BSH, sold by Omya, is hydrophobized calcium carbonate, 42% of the particles of which have a size of less than 2 microns.

Example 1: Preparation of the —NCO Component

1.A. Preparation of the Polyurethane (PU) Having NCO End Groups:

The polyurethanes PU having NCO end groups used in the following examples were prepared in the same way using the different ingredients appearing in table 1. The amounts of diisocyanate(s) and of polyol(s) used (expressed as % by weight of commercial product, with respect to the weight of —NCO component) correspond to an NCO/OH molar ratio ($r_1$) ranging from 1.6 to 1.7 approximately, as shown in table 1.

The diisocyanate(s) and the polyol(s) are mixed in a reactor kept constantly stirred and under nitrogen, at a temperature T1 ranging from 72° C. to 80° C. The temperature is controlled so as not to exceed 80° C.

The combined ingredients are kept mixed at this temperature until the hydroxyl functional groups of the polyols have been completely consumed.

The degree of progression of the reaction is monitored by measuring the content of NCO group by back titration of dibutylamine using hydrochloric acid, according to the standard NF T52-132. The reaction is halted when the content of NCO group measured is approximately equal to the content of NCO group desired.

1.B. Preparation of the —NCO Component by Mixing its Ingredients:

In the same reactor, kept constantly stirred and under nitrogen, the polyurethane comprising NCO end groups obtained is subsequently mixed with the other ingredients constituting the —NCO component, in the proportions shown in table 1.

After homogenization of the mixture (30 minutes), the content of NCO group and the content by weight of diisocyanate monomer in the —NCO component are respectively measured.

The content of NCO group in the —NCO component, expressed as percentage by weight with respect to the weight of the —NCO component (% NCO), is measured according to the standard NF T52-132.

The content by weight of diisocyanate monomer is measured by an HPLC method provided with a UV detector as described above (reversed-phase C18, mobile phase: aqueous acetonitrile solution, buffered with a 0.2% by weight aqueous tetrabutylammonium bisulfate solution at pH equal to 4.5, detection wavelength: 254 nm).

For all of the examples, the content by weight of diisocyanate monomer present in the —NCO component is less than or equal to 0.1% by weight of the weight of said component.

TABLE 1

| | | | P1 | P2 |
|---|---|---|---|---|
| —NCO Component | PU having NCO end groups | Scuranate ® T100 (48.1% NCO) | 30 | 20 |
| | | Voranol ® P400 (OHN = 260 mg KOH/g) | 40 | 25 |
| | | Voranol ® P2000 (OHN = 56 mg KOH/g) | — | 25 |
| | | Dekatol ® 3008 (OHN = 112 mg KOH/g) | 10 | — |
| | | NCO/OH Ratio ($r_1$) | 1.7 | 1.6 |
| | | Desmodur ® N3300 (21.8% NCO) | 20 | 30 |
| Total of the ingredients of the —NCO component | | | 100 | 100 |
| Viscosity at 23° C. (Pa · s) | | | 4.8 | 1.2 |
| % Free TDI | | | 0.09 | 0.04 |

The % values shown in the table are % weight/weight values

Measurement of the viscosity: The measurement carried out at 23° C. was performed using a Brookfield RVT viscometer with a spindle suited to the viscosity range and at a rotational speed of 20 revolutions per minute (rev/min).

Example 2: Preparation of the —OH Component

The different ingredients constituting the —OH component are mixed in the proportions shown in table 2, at a temperature ranging from 40° C. to 50° C., in a reactor kept constantly stirred and under nitrogen.

After homogenization of the mixture (approximately 1 hour), the content of OH group in the —OH component, expressed in milligrams of KOH per gram of —OH component (mg KOH/g), is measured.

TABLE 2

| | | OH1 | OH2 |
|---|---|---|---|
| —OH Component | EHD: 2-ethylhexanediol (OHN = 767 mg KOH/g) | 13.2 | — |
| | Voranol ® P1000 (OHN = 112 mg KOH/g) | 12.2 | — |
| | Voranol ® P2000 (OHN = 56 mg KOH/g) | — | 11.4 |
| | Voranol ® CP450 (OHN = 383 mg KOH/g) | 19.3 | 10.4 |
| | DEG: diethylene glycol | — | 12.4 |
| | Priamine 1071 | 4.1 | 1.6 |
| | Socal 312 | 8.1 | 8.3 |
| | Omya BSH | 42.8 | 55.9 |
| | Borchi KAT 315 | 0.3 | — |
| Total of the ingredients of the —OH component | | 100 | 100 |

The % values shown in the table are % weight/weight values

Example 3: Preparation of the Adhesive Composition

The —NCO component prepared in example 1 and the —OH component prepared in example 2 were mixed, according to the ratios mentioned below in table 3.

The mixing is carried out at a temperature of approximately 50° C., according to the given ratio by volume.

TABLE 3

| | C1 | C2 |
|---|---|---|
| —NCO Component P1 | x | |
| —NCO Component P2 | | x |
| —OH Component OH1 | x | |
| —OH Component OH2 | | x |
| —NCO Component/—OH Component ratio by volume | 2/1 | 2/1 |

Example 4: Evaluation of the Performance Qualities

Measurement of the Tensile Strength and of the Elongation at Break by a Tensile Test:

The measurement of the tensile strength (breaking stress) and of the elongation at break by a tensile test was carried out according to the protocol described below.

The principle of the measurement consists in drawing, in a tensile testing device, the movable jaw of which moves at a constant rate equal to 100 mm/minute, a standard test specimen consisting of the crosslinked composition and in recording, at the moment when the test specimen breaks, the tensile stress applied (in MPa) and also the elongation of the test specimen (in %). The standard test specimen is dumbbell-shaped, as illustrated in the international standard ISO 37 of 2011. The narrow part of the dumbbell used has a length of 20 mm, a width of 4 mm and a thickness of 500 μm.

Adhesive Bonding Tests

The adhesive bondings are produced on strips made of beech or of sheet metal which is painted originating from Rocholl. A zone of 25*12.5 mm was delimited on a strip using wedges made of Teflon with a thickness of 1 mm. This zone was filled with the test composition and then a second strip of the same material was laminated. The combination was held by a clamp and placed in a climate-controlled chamber at 23° C. and 50% RH (relative humidity) for a week before tensile testing on a universal testing machine. The aim of the tensile testing on a universal testing machine is to evaluate the maximum force (in MPa) to be exerted on the assemblage in order to separate it. Recourse to a tensile testing device makes it possible to subject a lap joint placed between two rigid supports to a shear stress up to failure by exerting tension on the supports parallel to the surface of the assemblage and to the main axis of the test specimen. The result to be recorded is the breaking force or stress. The shear stress is applied via the movable jaw of the tensile testing device with a displacement at the rate of 100 mm/min. This tensile testing method is carried out as defined by the standard EN 1465 of 2009.

Wet Poultice Tests
Preparation of the Poultice:
- Cut out and weigh a strip of hydrophilic cotton wool of sufficient length to cover the test specimens. Weigh the strip of cotton wool. Deposit the first test specimen on one end of the strip of cotton wool and cover it with cotton wool.
- Repeat the operation with the following test specimens; each test specimen is thus covered with the same amount of cotton wool.
- Introduce the assembly into a polyethylene bag.
- Add a weight of deionized water equal to 10 times that of the cotton wool, taking care to wet uniformly by pressing.
- Drive off the air by smoothing the bag by hand.
- Close the PE bag by welding.
- In order to ensure a perfect seal, the assembly is introduced into a second bag which has to be welded as above.

Conditions for Exposure of the Poultice:
The poultice was placed for 7 days in a chamber maintained at 70° C.

After 7 days, the poultices were taken out of the chamber and, immediately, the test specimens were removed from the bag and from the cotton wool and then placed for two hours in a chamber at −20° C.

At the end of the 2 hours at −20° C., the test specimens were placed in a climate-controlled chamber (23° C. and 50% RH) for a minimum duration of 2 hours and a maximum duration of 4 hours before proceeding to the tensile testing of the test specimens on a universal testing machine, as described for the adhesive bonding tests.

The properties obtained for the compositions prepared are summarized in the following table 4:

| | Adhesive bonding Painted sheet metal | | Test specimen H2 | | Test specimen H2 (after wet poultice) | |
|---|---|---|---|---|---|---|
| Composition | Fmax (MPa) | Facies | Elongation (%) | Breaking stress (MPa) | Elongation (%) | Breaking stress (MPa) |
| C1 | 7.9 | CF | 160 | 5.8 | — | — |
| C2 | 8.5 | CF | 150 | 6.6 | 93 | 3.3 |

CF: cohesive failure
Fmax: maximum force at the time of the failure of the adhesive bonding The compositions C1 and C2 advantageously have a reduced content of residual diisocyanate monomers.

Furthermore, they advantageously result in an adhesive bonding on painted sheet metal which leads to cohesive failure (CF), which denotes in particular good adhesion in the motor vehicle field. Moreover, the maximum force (Fmax) at the time of the failure is advantageously high (greater than 7 MPa).

In addition, the compositions 01 and C2 advantageously result in an adhesive joint exhibiting, after crosslinking, good mechanical performance qualities:
- elongation at break of greater than or equal to 150%; and
- breaking stress of greater than 5 MPa (semi-structural adhesive bonding).

The wet poultice test shows that the composition C2 has not lost more than 50% of its initial properties, advantageously demonstrating a good resistance of the composition to moisture.

The invention claimed is:

1. A composition comprising:
an —NCO component comprising:
  A) at least one polyurethane comprising at least two NCO end groups obtained by a polyaddition reaction:
    of at least one asymmetric diisocyanate and
    of at least one polyol, and
  B) at least one polyisocyanate comprising at least three isocyanate —NCO functional groups selected from the group consisting of biurets, isocyanurates, adducts of diisocyanates and of triols, and their mixtures; and
an —OH component comprising:
  at least one polyol P1 having a number-average molecular weight of greater than or equal to 1000 g/mol,
  at least two polyols P2 having a number-average molecular weight of less than or equal to 500 g/mol, including at least one polyether triol and at least one polyether diol; and
  a total content of filler(s) of greater than or equal to 35% by weight, with respect to the total weight of said —OH component.

2. The composition as claimed in claim 1, in which:
the total content of polyol(s) P1 ranges from 5% to 30% by weight, with respect to the total weight of the —OH component; and/or
the total content of polyol(s) P2 ranges from 5% to 60% by weight, with respect to the total weight of the —OH component.

3. The composition as claimed in claim 1, in which the —OH component comprises a total content of filler of greater than or equal to 40% by weight, with respect to the total weight of said —OH component.

4. The composition as claimed in claim 3, in which the filler is selected from the group consisting of clay, quartz, carbonate fillers, kaolin, gypsum, and their mixtures.

5. The composition as claimed in claim 1, in which the —OH component comprises:
at least 35% by weight of filler chosen from calcium carbonates; and
from 0% to 70%, by weight of chalk;
the percentages by weight being with respect to the total weight of the —OH component.

6. The composition as claimed in claim 1, in which the —OH component comprises at least one polyamine comprising at least one primary or secondary amine functional group, said polyamine having a number-average molecular weight ranging from 50 g/mol to 5000 g/mol.

7. The composition as claimed in claim 6, in which the polyamine is selected from the group consisting of polyetheramines, polyamidoamines, fatty amine dimers or trimers, polyethyleneimines (PEI), polyethyleneimine dendrimers, polypropyleneimines (PPI), polypropyleneimine dendrimers, polyallylamines, poly(propylene-ethylene)imines and their mixtures, said polyamine having an amine number ranging from 20 to 1870 mg KOH/g.

8. The composition as claimed in claim 6, in which the polyamine corresponds to one of the formulae (I-1), (I-2) or (I-3) below:

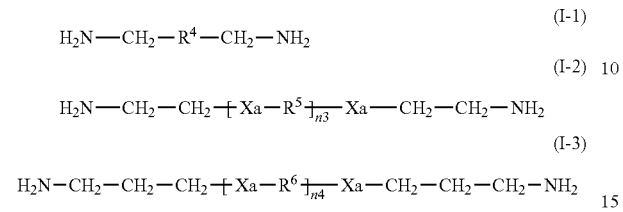

wherein:
- $R^4$ is a bond, a linear or branched divalent alkylene radical or a divalent arylene radical comprising from 1 to 18 carbon atoms;
- $R^5$ represents a linear or branched divalent alkylene radical comprising from 2 to 12 carbon atoms,
- $R^6$ represents a linear or branched divalent alkylene radical comprising from 2 to 10 carbon atoms,
- $X_a$=O, S, $NR^7$ in which $R^7$ represents H or a saturated or unsaturated and linear or branched alkyl group comprising from 1 to 10 carbon atoms;
- $n_3$ is an integer ranging from 0 to 4; and
- $n_4$ is an integer ranging from 0 to 2.

9. The composition as claimed in claim 6, in which the —OH component comprises a total content of polyamine(s) ranging from 0.1% to 6% by weight, with respect to the total weight of said —OH component.

10. The composition as claimed in claim 1, in which polyurethane A) comprising at least two NCO end groups is obtained by a polyaddition reaction:
- of at least one asymmetric diisocyanate and
- of at least one polyol,
- said asymmetric diisocyanate monomer(s) is (are) selected from the group consisting:
- of isophorone diisocyanate (IPDI);
- of toluene diisocyanate (TDI);
- of the hydrogenated form of TDI
- of 2,4'-diphenylmethane diisocyanate (2,4'-MDI);
- of the hydrogenated form of 2,4'-diphenylmethane diisocyanate (2,4'-MDI); and
- of their mixtures;
- and said polyol is selected from the group consisting of polyether polyols, polyester polyols and their mixtures.

11. The composition as claimed in claim 1, wherein the amounts of isocyanate monomer(s) and of polyol(s) used in the synthesis of the polyurethane A) are such that the NCO/OH molar ratio, denoted $r_1$, ranges from 1.5 to 2.

12. The composition as claimed in claim 1, in which the —NCO component comprises a total content of polyisocyanate(s) comprising at least three —NCO functional groups B) ranging from 5% to 60% by weight, with respect to the total weight of the —NCO component.

13. The composition as claimed in claim 1, in which the —NCO component comprises B) at least one polyisocyanate comprising at least three isocyanate NCO functional groups selected from the group of isocyanurates.

14. The composition as claimed in claim 1, in which the —OH component/—NCO component ratio by volume ranges from 1/3 to 3/1.

15. The composition as claimed in claim 1, wherein it is an adhesive composition.

\* \* \* \* \*